(12) United States Patent
Conner et al.

(10) Patent No.: US 6,196,537 B1
(45) Date of Patent: Mar. 6, 2001

(54) THICKNESS MEASUREMENT APPARATUS

(75) Inventors: Charles Jeffrey Conner, Dayton; James Richard Schlough, Troy; Alan Scott Farr, Huber Heights, all of OH (US)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/188,239

(22) Filed: Nov. 9, 1998

(51) Int. Cl.[7] .................................................. B65H 43/08
(52) U.S. Cl. ..................................... 270/52.15; 270/52.06; 270/58.03; 271/263
(58) Field of Search ............................. 270/52.15, 52.06, 270/52.26, 58.03; 271/262, 263; 198/502.2

(56) References Cited

U.S. PATENT DOCUMENTS

| | | | |
|---|---|---|---|
| 3,614,086 | * 10/1971 | Bushnell | 271/263 X |
| 3,664,655 | * 5/1972 | McCain et al. | 270/52.26 |
| 3,918,704 | * 11/1975 | Sugiyama et al. | 271/263 X |
| 4,471,954 | 9/1984 | Bourg . | |
| 5,125,642 | * 6/1992 | Orsinger et al. | 271/262 |
| 5,213,318 | 5/1993 | Newhall . | |
| 5,303,912 | * 4/1994 | Blank et al. | 271/263 |
| 5,622,268 | * 4/1997 | Conner et al. | 270/52.26 X |
| 5,967,503 | * 10/1999 | Newsome | 270/52.04 |

\* cited by examiner

Primary Examiner—H. Grant Skaggs
Assistant Examiner—Patrick Mackey
(74) Attorney, Agent, or Firm—Burns, Doane, Swecker & Mathis, LLP

(57) ABSTRACT

An apparatus for measuring the thickness of flat products such as sheets or signatures, the flat products being fed from a pile of signatures to a pocket by a pocket feeder. The pocket feeder includes a first and second roller. The first roller is arranged against the second roller to form a nip therebetween for receiving a flat product. The first roller is deflectable when a flat product enters the nip. The apparatus comprises a first proximity target which is arranged on the first roller and a second proximity target which is fixedly arranged on the receiving unit. A proximity switch monitors the targets and a control unit starts and stops counting the pulses generated by an encoder. To calculate the thickness of a flat product, the counted pulses are compared to a stored value.

10 Claims, 3 Drawing Sheets

THICKNESS MEASUREMENT APPARATUS

TECHNICAL FIELD

This invention relates to an apparatus for the measurement of the thickness of flat products such as sheets or signatures and is particularly directed to an apparatus for measuring the thickness of sheets or signatures being fed by a feeding mechanism from a pile of signatures to a transport device such as a pocket feeder, in order to detect a malfunction of the feeding mechanism.

BACKGROUND OF THE INVENTION

In the technology of building books including booklets, magazines, periodicals, and so on, the use of collating systems is well known. These systems typically have a transporting device on which individual signatures are gathered to build a book-block set, which then is finished and bound. Typically a number of hoppers is arranged along the transporting device where each of the hoppers comprises a feeding mechanism for feeding an individual signature from a pile of signatures onto the transporting device, in order to progressively build up the book-block set. Such feeding mechanisms typically employ callipering devices for detecting a malfunction of any of the feeding mechanisms on a given line. Such a malfunction may, for example, result in a delivery of more or less than the intended number of sheets onto the transporting device.

To alleviate these problems some efforts have previously been made to design collating systems having callipering devices for measuring the thickness of sheets being delivered from a pile of signatures to a transporting device. These calipers typically employ a mechanical feeder gauge which is calibrated to measure the thickness of the sheets being fed from a hopper to a transporting device. Such a thickness measurement device is, for example, known from U.S. Pat. No. 4,471,954, the disclosure of which is hereby incorporated by reference. This document discloses a transporting device in the form of a pocket feeder having a plurality of sheet loading pockets. Each of the pockets is associated with a sheet ejector for ejecting single sheets into a common sheet conveyor path from the respective pocket. A photo-electric sheet passage detector is mounted between each pocket and the common sheet conveyor path which generates a transparency or reflectivity signal of the sheet and which is compared to a stored averaged signal representative for a single sheet.

Another apparatus for measuring the thickness of sheets being fed from a hopper to a pocket feeder is known from U.S. Pat. No. 5,213,318, the disclosure of which is hereby incorporated by reference. The apparatus of U.S. Pat. No. 5,213,318 comprises a plurality of hoppers for holding signatures where the plurality of pockets is movable past the plurality of hoppers. Each of the pockets has a first fixed roller and a second movable roller being in contact with each other when no sheet is fed between the two rollers. When a flat product passes between the two rollers the second roller is deflected, where the amount of the deflection corresponds to the thickness of the product passing. In order to measure the thickness the deflection of the second roller is measured. The second roller therefore is mounted on a movable shaft which comprises a plate on one of its ends. The plate is rotatable and arranged within a gap between a light source and a light sensor. Depending on the degree of rotation of the shaft the plate has a corresponding angular position and depending on this angular position it interrupts more or less light from the light source where the amount of interrupted light corresponds to the deflection the rollers.

The accuracy of this method however is limited due to shadow-effects and due to the limited resolution of the light sensor. Furthermore, every pocket has to be provided with a separate light source.

SUMMARY OF THE INVENTION

It is an object of the present invention to increase the accuracy of the thickness measurement and to provide an improved apparatus for measuring the thickness of flat products.

In summary, according to one aspect of the present invention, an apparatus for measuring the thickness of flat products such as sheets or signatures is disclosed, where the flat products are fed by a feeder from a pile of signatures to a receiving location. The feeder includes a first and a second roller where the first roller is arranged against the second roller to form a nip therebetween for receiving the flat product, wherein the first roller is deflectable when a flat product enters the nip. The apparatus comprises a first proximity target being arranged on the first roller and a second proximity target being fixedly arranged on the transporting device. The apparatus furthermore includes at least one proximity switch which is arranged apart from the transporting device for monitoring at least one of the first and second proximity targets.

Solutions according to the present invention are advantageous, since the present invention can measure the thickness of the flat products with high accuracy. Furthermore, the present invention can magnify the very slight movement of the first roller which corresponds to the thickness of the flat product by measuring the distance in the appearance of the first and second proximity targets.

According to further details of the present invention, the first and second proximity targets can be arranged on a movable transporting device, including movable receiving units, so-called compilers, which have a pocket and a pocket feeder. The proximity switch and a calculating unit can be arranged stationary apart from said movable transporting device. This separation of the components leads to the advantage that only one proximity switch is needed to detect the appearance of a plurality of receiving units or compilers.

According to another detail of the present invention, the first proximity switch can be arranged stationary apart from the movable receiving unit at a location where it can monitor the first and second proximity target. When the proximity switch detects the first proximity target a microcomputer begins to count the pulses generated by an encoder. The microcomputer stops counting as soon as the proximity switch detects the second proximity target. As the number of counts refers to the thickness of the flat product, the thickness can be calculated from the number of counts.

According to a further aspect of the present invention the thickness measurement apparatus includes a plurality of hoppers for holding stacks of sheet material, a plurality of receiving units or compilers having a receiving location and a feeding mechanism for performing sheet feeding operations to feed sheet material from said hoppers to said receiving locations. The apparatus further includes driving means for sequentially moving each of said receiving units past each of said hoppers in turn and comprises a plurality of first and second proximity targets. Each of said first proximity targets is movable and attached to each of said feeding means and each of said second proximity targets is attached fixedly to each of said receiving units. A first proximity switch for sensing one of the plurality of the first and second proximity targets is arranged stationary, apart from the receiving units. An encoder for generating pulses is stationary apart from the receiving units and a microprocessor unit is arranged stationary apart from the receiving units which monitors the pulses of said encoder and said first and second sensor signal.

BRIEF DESCRIPTION OF THE DRAWINGS

The foregoing and other features of the present invention will become apparent to one skilled in the art upon a consideration of the following description of the invention with reference to the accompanying drawings, wherein.

DESCRIPTION OF THE PREFERRED EMBODIMENT

Figure 1:
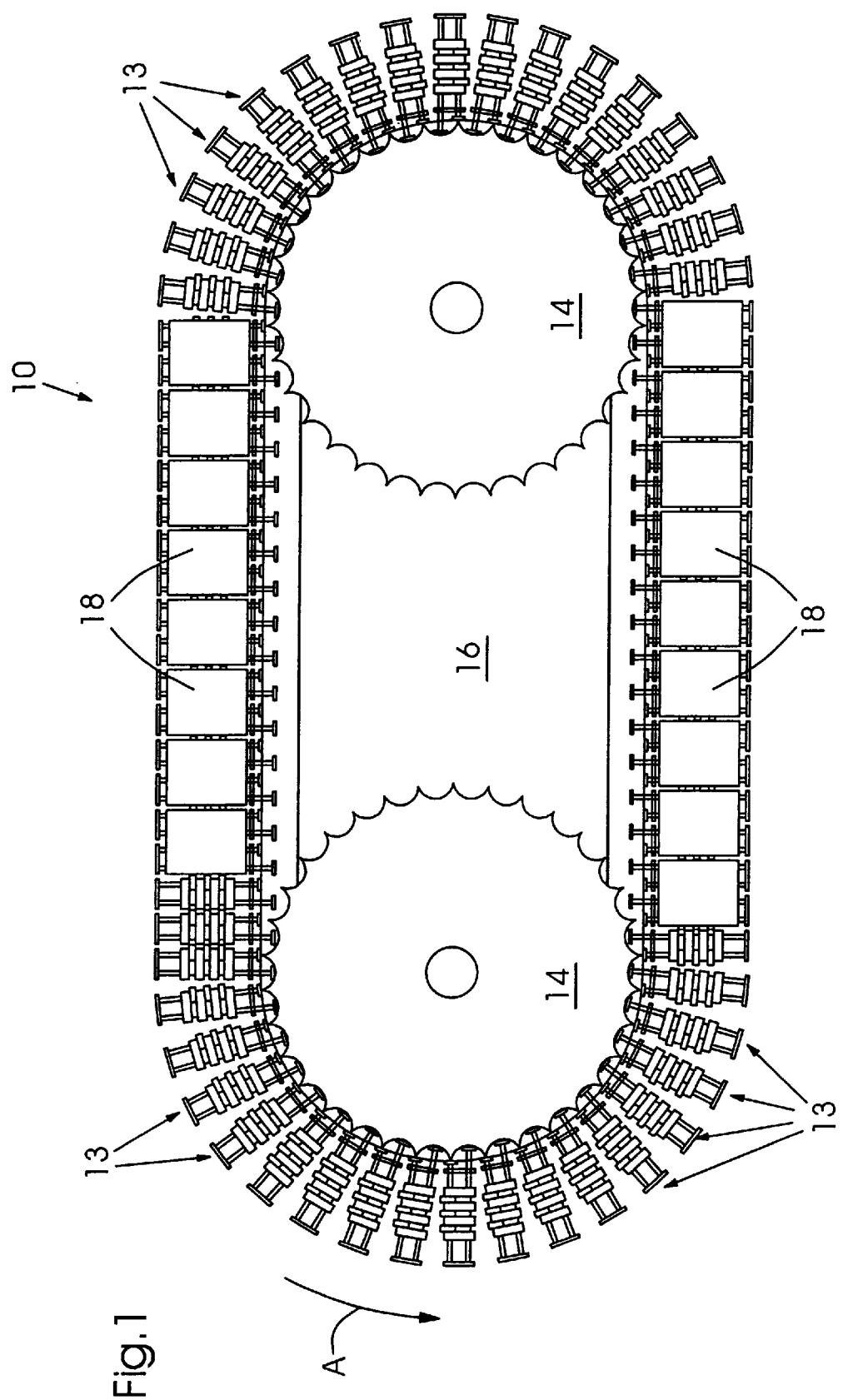
FIG. 1 is a schematic plan view of an exemplary collator embodying the present invention.
Figure 6:
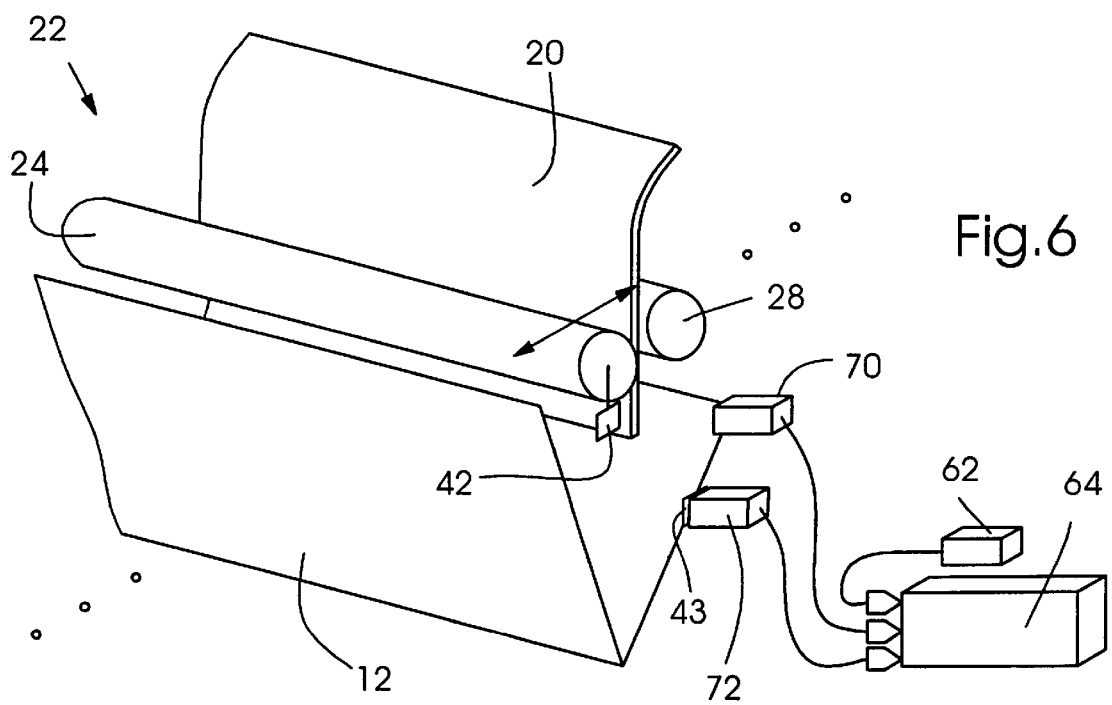
FIG. 6 is a schematic perspective view of an exemplary thickness measurement device of a collating apparatus according to the present invention.

Referring to FIG. 1 a collator 10 comprises a plurality of receiving units 13, so-called compilers, moving along a conveying path in a direction given by the arrow A. Each of the receiving units 13 has a receiving location, for example, a pocket 12 (FIG. 6), for receiving flat products and a feeding mechanism 22 (FIG. 6) for collating a plurality of flat products in a given order in the pocket. The plurality of receiving units 13 is arranged in an endless loop and travel around sprocket wheels 14 mounted on a central frame 16. At infeed stations 18 piles of flat products are arranged where one flat product of each piles is to be delivered to the pockets. The infeed stations 18 may be arranged at various locations along the path and are at least of the number of signatures which shall be delivered to each pocket, but may be more. A single flat product such as a sheet or signature 20 (FIG. 3) is fed from the pile of flat products of each infeed station to one of the receiving units 13 when a receiving unit 13 passes one of the infeed station 18 beneath. When a malfunction of the feeder mechanism occurs it is possible that either no signature (miss feed) or a wrong number of signatures (double feed) is delivered to the pocket.

When a miss or double feed is detected a system that controls the collating process can send a signal to all the downstream infeed stations 18 to inhibit the feeding of signatures into the same receiving unit. The partly assembled book in this unit is then rejected at the end of the collating process. In the case of selective collating, where books of a custom make up are created by feeding or not feeding from all the available feed locations the control system either causes the book to be made again, or a substitute book is entered into the product stream to take its place.

Figure 2:
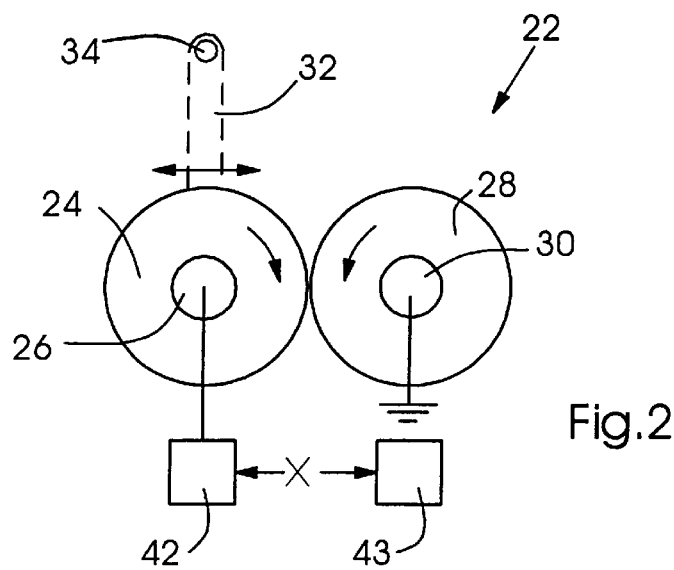
FIG. 2 is a schematic view of a portion of an exemplary thickness measurement device according to the present invention when no sheet is fed.

FIG. 2 shows a schematic side view of a feeding mechanism 22 for feeding a sheet or signature 20 (FIG. 3) from a pile of signatures to a receiving pocket. The feeding mechanism 22 includes a first roller 24 having a first shaft 26 a second roller 28 having a second shaft 30. The movable roller 24 is deflectable linearly as indicated by the arrow when a flat product enters the nip. Alternatively, it may be coupled to a lever arm 32 which is rotatably mounted on an axle 34 and therefore rotatable about the axle 34 as indicated by the dotted lines. A first proximity target 42 is arranged on the first roller 24, for example, on the first axis 26. A second proximity target 43 is fixedly arranged on the receiving unit 13 at a location which does not move during feeding of a flat product relative to the deflection of the first roller. When no signature is fed, the rollers 24 and 28 which are arranged against each other are in close contact to each other and can be in touch. In this state the movable first roller 24 is not deflected and the distance between the first and second proximity targets 42, 43 corresponds to the thickness d=0 which indicates that no flat product is being fed.

Figure 3:
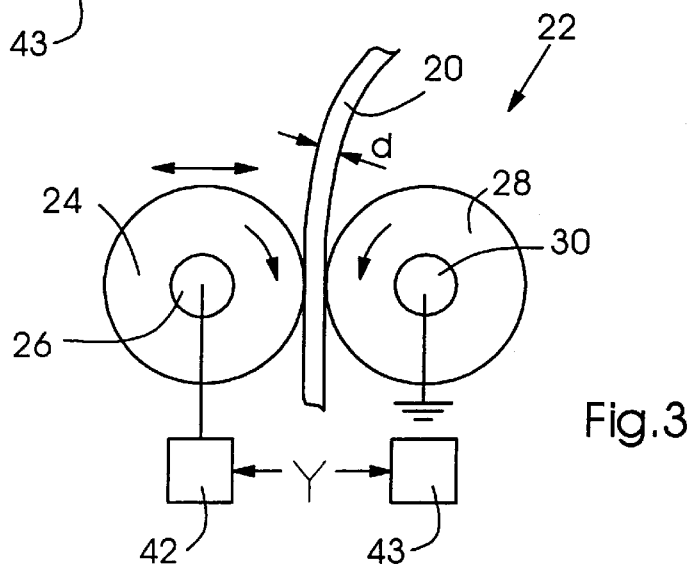
FIG. 3 is a schematic view of a portion of an exemplary thickness measurement device according to the present invention, illustrating a sheet material being fed between a pair of roller during normal feed.

When a signature 20 is fed from the pile of signatures to the receiving pocket it enters the nip between the rollers 24 and 28 as schematically shown in FIG. 3. The movable roller 24 is deflected linearly or rotated about the axis defined by the axle 34 and deflected to a certain amount with respect to the thickness of the signature 20. Consequently the first proximity target 42 which is arranged on the first shaft 26 is deflected, and the distance between the proximity targets 42 and 43 is increased to an amount y corresponding to the thickness d of the flat product 20.

Figure 4:
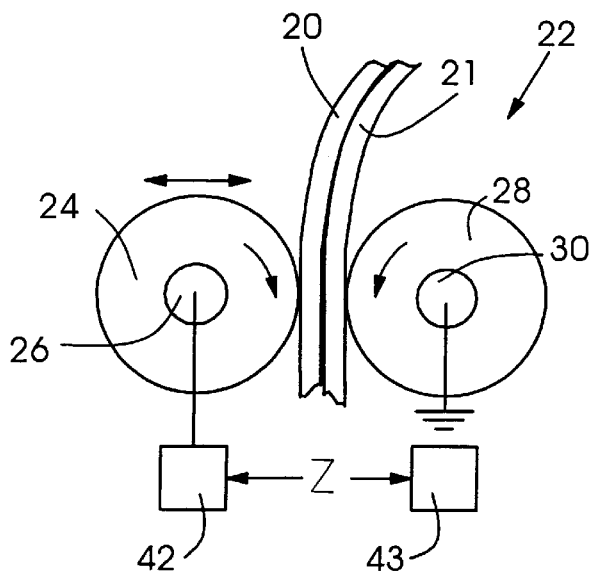
FIG. 4 is a schematic view of a portion of an exemplary thickness measurement device according to the present invention, illustrating a sheet material being fed between a pair of roller during malfunction of the feeder.

If a double feed occurs this may for example result in a feeding of two signatures 20, 21 from the pile of signatures to the receiving pockets as schematically shown in FIG. 4. If two signatures 20, 21 are fed from the pile of signatures to the receiving unit, both enter the nip between the rollers 24 and 28. The movable roller 24 is deflected to a certain amount corresponding to the accumulated thicknesses of the first signature 20 and the second signature 21, indicated by the distance z. The sum of the two thicknesses normally is substantially equal to a value of twice the thickness d of one flat product 20. As a consequence the amount of the deflection of the first proximity target 42 is greater than in the case of a correct valid feed.

It is therefore possible to determine the thickness of the sheets or signatures by simply evaluating the distance of the proximity targets 42, 43 as it will be described below in greater detail.

Figure 5:
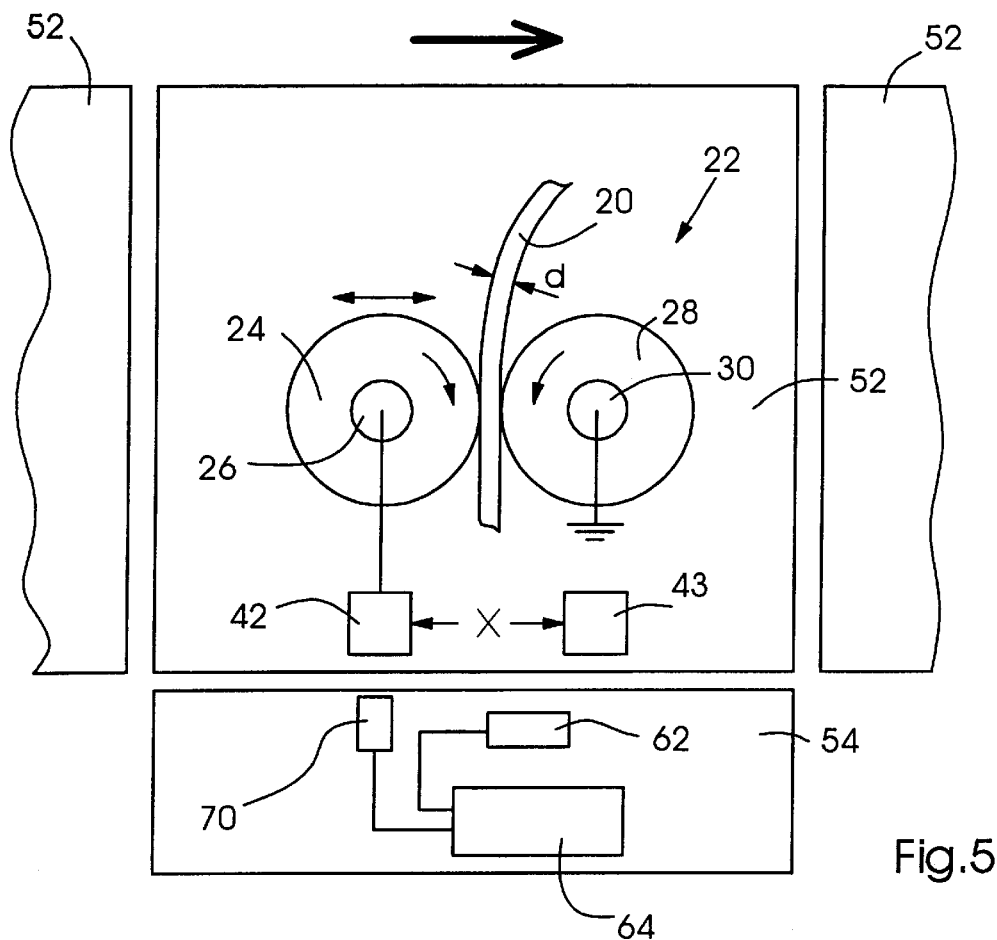
FIG. 5 is a schematic view of a further exemplary embodiment of the thickness measurement device according to the present invention.

Referring now to FIG. 5 a schematic view of the feeding apparatus having a thickness measurement device according to one embodiment of the present invention is shown. The thickness measurement device includes a plurality of first parts 52 and a single second part 54 where the first parts 52 are movable relative to the second part 54, for example, in the direction given by the arrow. The first parts 52 are arranged on the transport device, and especially on the receiving units 13 of the conveyor 10. Each of the first parts 52 comprises a feeding mechanism 22, a first proximity target 42 arranged on the first deflectable roller 24, and a second proximity target 43 arranged in a fixed position. The second part 54 is arranged stationary and apart from the first part 52, and includes a proximity switch 70 and an evaluation unit 64, for evaluating the signals generated by the proximity switch 70. The evaluation unit 64, which can be called a calliper control unit, may include a microcomputer especially for calculating the thickness of the sheet or signature. The control unit 64 is coupled to an encoder 62 which generates pulses corresponding to the movement of the transport device, especially to the first part 52. The feeding mechanism 22 includes a first roller 24 having a first shaft 26 and a second roller 28 having a second shaft 30. The first roller 24 is deflectable and is deflected when a sheet or signature 20 enters the nip between the first and second roller. The first proximity target 42 is arranged on the first roller 24, and can be mounted on a first axle 26 extending through the first roller 24.

When one of the first parts 52 of the thickness measurement apparatus passes the second part 54 the proximity switch 70 detects the fixed proximity target 43. Upon this detection, the calliper control unit 64 will start to count the pulses generated by an encoder 62 which continuously outputs pulses indicating, for accumulating counts from the encoder when the proximity switch 70 detects the movable reference proximity target 42. The accumulated number of pulses correlates to the distance of the two proximity targets 42 and 43 and to a thickness of the flat products or products fed between the two rollers 24 and 28 respectively. To determine if a miss or double feed has occurred, the accumulative number of pulses can be compared with a valid value of counts corresponding to the thickness of one singe flat product or a valid range of counts corresponding to the thicknesses of one single flat product which was previously stored. This valid value or valid value range may be stored for each receiving unit. This could be done during a so-called learning cycle where the number of encoder counts for both an empty machine and a nominal paper thickness for a given run is stored for each receiving unit in a table. The stored information for each receiving unit accommodates the difference in tolerance areas in manufacture of each. As the calliper control unit which includes a microprocessor has access to this stored table it is possible to compare the subsequent measurement during a feeding operation to the data stored. If the distance is twice the deflection distance expected it indicates that a faulty double feed has occurred. If the measurement is that of a feed with no paper it signals a miss feed.

For performing this method, the pulses generated by the encoder are adapted to the movement of the first part 52 of the machine. Therefore, an encoder learn procedure is used to locate an index pulse within the compiler cycle. This procedure includes the accurate positioning of the fixed proximity target 43 and storing this position for each receiving unit 13. When storing this position, a virtual index pulse is created at a predetermined distance before the fixed target reaches the respective proximity switch and which will be communicated from the encoder to the control unit 64.

Having performed this encoder learn procedure the machine is ready for feeding flat products from a pile of flat product to the moving receiving units on a transport device while measuring the thickness of the flat product The measurement process can be carried out by using a single proximity switch 70 for detecting each of the proximity targets 42 and 43 as described above as well as by using two different proximity switches 70 and 72 where each of them is arranged to detect one of the proximity targets 42 and 43. The measurement process is described in more detail with respect to FIG. 6. When the encoder passes the learned virtual index position the measurement cycle begins and the measurement counter is reset. A receiving unit counter is implemented and the number of the actual receiving unit is displayed. As soon as the receiving unit number 1 passes the proximity switch 70 the receiving unit counter is reset and set to one.

When the leading edge of the fixed target 43 passes the second proximity switch 72 the pulses generated by the encoder 62 are gated into the measurement counter of the calliper control unit 64. When the leading edge of the movable target 42 passes the first proximity switch 70 counting is stopped. Detecting the leading edge of the proximity switches 42 and 43 ensures the fastest signal processing.

The measured number of counts now is compared to a previously stored value of counts indicating a valid number of counts or a valid number of a count range for the feeding of a single flat product. This stored value can be taken from a table where this specific value of the table refers to the actual receiving unit 13. Comparing can be done for example by subtracting the measured value from the stored value. If this result exceeds a certain threshold based on the tolerance determined during the learn cycle either a valid feed, a miss feed or a double feed will be asserted. The respective result may be indicated by an LED.

Furthermore, the calliper control unit 64 can comprise an automatic trending mechanism to match variation in signature thickness or other gradual changes in the calliper system. This could for example be done by adapting the stored reference value of counts of each receiving unit according to the number of counts actually measured. Therefore, each new measurement which is within the tolerance may be added to the average obtained during the learned cycle and a new average may be calculated and stored in the table again.

The measurement system furthermore may comprise some indicators for a malfunction of the proximity switches 70, 72, the receiving unit counter which is integrated into the calliper control unit 64 or the encoder 62. If exactly two proximity targets 42 and 43 have not been sensed by the beginning of the next measurement cycle a proximity switch fault is generated for that specific receiving unit. The proximity switch fault condition will be maintained until it is reset by an operator or by a software operation. The receiving unit number comprising the proximity switch fault may be displayed at the calliper control unit 64.

As already described above the calliper control unit 64 counts the number of receiving units 13 by counting each time the encoder 62 passes its virtual index pulse beginning with the receiving unit number one proximity signal. Each time the receiving unit number one proximity signal is encountered the number of encoder revolutions is compared to the previously stored number of receiving units counting during the learner cycle. If these two numbers differ a compiler count fault is generated. A display of the compiler control unit may show how many receiving units were missing or too much. The receiving unit counts fault condition will remain until it is reset by an operator or a software logic.

Furthermore, the number of counts between the encoder virtual index position may be continuously checked. If this number is not equal to a predetermined given number, for example 4000, an encoder error may exist. This could be handled by a warning signal which indicates an encoder fault.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

We claim:

1. An apparatus for measuring the thickness of flat products comprising:
   a first and a second roller, the first roller being arranged against the second roller to form a nip therebetween for receiving flat product, wherein the first roller is deflectable when a flat product enters the nip, and wherein the first and second rollers are mounted on a movable transporting device;
   a first proximity target arranged on the first roller;
   a second proximity target fixedly mounted on said transporting device; and
   at least one proximity switch arranged apart from said movable transporting device for monitoring at least one of the first and second proximity targets.

2. An apparatus according to claim 1, further comprising:
   a control unit coupled to said at least one proximity switch for receiving signals from said at least one proximity switch; and
   an encoder for generating pulses being coupled to said control unit.

3. An apparatus according to claim 1, wherein the movable transporting device comprises:
   a receiving unit including the first and second roller.

4. An apparatus according to claim 3, wherein said receiving unit comprises:
   a pocket for receiving the flat products.

5. An apparatus according to claim 1, comprising:
   first and second proximity switches, wherein the first proximity switch is arranged to detect the first proximity target and the second proximity switch is arranged to detect the second proximity target.

6. An apparatus according to claim 5, wherein the apparatus further comprises:
   a control unit coupled to said first and second proximity switches for receiving a signal from said first and second proximity switches; and
   an encoder for generating pulses coupled to said control unit.

7. An apparatus for forming sheet material assemblages, comprising:
   a plurality of hoppers for holding sheet material;
   a plurality of receiving units each having a receiving location;
   a plurality of feeding mechanisms for performing sheet feeding operations to feed flat products from said hoppers to said receiving locations, each of the feeding mechanisms being coupled to one corresponding receiving location and having a first and second roller, the first roller being arranged against the second roller to form a nip therebetween for receiving the flat products, wherein the first roller is deflectable when a flat product enters the nip;
   driving means for sequentially moving each of said receiving units past each of said hoppers;
   a plurality of first proximity targets, one of said plurality of first proximity targets being attached to each of said first rollers;
   a plurality of second proximity targets, one of said plurality of second proximity targets being fixedly attached to each of said receiving units; and
   at least one proximity switch mounted apart from said receiving units for monitoring at least one of said first and second proximity targets.

8. An apparatus according to claim 7, further comprising:
   a control unit coupled to the at least one proximity switch for receiving signals from said at least one proximity switch; and an encoder for generating pulses being coupled to said control unit.

9. An apparatus according to claim 7, further comprising:
   a movable transporting device having a receiving unit with the first and second rollers mounted thereon.

10. An apparatus according to claim 9, wherein said receiving unit comprises:
    a pocket for receiving the flat products.

* * * * *